(12) United States Patent
Hanes, Jr. et al.

US007082995B2

(10) Patent No.: US 7,082,995 B2
(45) Date of Patent: Aug. 1, 2006

(54) METHODS AND COMPOSITIONS FOR REDUCING THE VISCOSITY OF TREATMENT FLUIDS

(75) Inventors: Robert E. Hanes, Jr., Duncan, OK (US); Jimmie D. Weaver, Duncan, OK (US); Billy F. Slabaugh, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 187 days.

(21) Appl. No.: 10/794,607

(22) Filed: Mar. 5, 2004

(65) Prior Publication Data
US 2005/0194139 A1 Sep. 8, 2005

(51) Int. Cl.
*E21B 43/26* (2006.01)
*E21B 43/04* (2006.01)

(52) U.S. Cl. .............. 166/279; 166/278; 166/300; 166/308.5

(58) Field of Classification Search .............. None
See application file for complete search history.

(56) References Cited

U.S. PATENT DOCUMENTS

| | | | |
|---|---|---|---|
| 5,497,830 A | 3/1996 | Boles et al. |
| 5,521,257 A | 5/1996 | Ross |
| 5,624,886 A | 4/1997 | Dawson et al. |
| 6,177,385 B1 | 1/2001 | Nimerick |
| 6,209,646 B1 | 4/2001 | Reddy et al. |
| 6,310,008 B1 | 10/2001 | Rietjens |
| 6,419,016 B1 | 7/2002 | Reddy |
| 6,488,091 B1 | 12/2002 | Weaver et al. |
| 6,794,340 B1 * | 9/2004 | Nguyen et al. ............ 507/110 |
| 2002/0160920 A1 | 10/2002 | Dawson et al. |
| 2003/0114539 A1 | 6/2003 | Weaver et al. |
| 2003/0166471 A1 | 9/2003 | Samuel et al. |
| 2003/0236171 A1 | 12/2003 | Nguyen et al. |

FOREIGN PATENT DOCUMENTS

EP  1 398 459 A2  3/2004

OTHER PUBLICATIONS

Foreign communication from related counterpart application dated Jul. 4, 2005.
U.S. Appl. No. 10/664,206, filed Sep. 9, 2003, Hanes et al.
U.S. Appl. No. 10/668,807, filed Sep. 23, 2003, Hanes et al.

* cited by examiner

*Primary Examiner*—Zakiya W. Bates
(74) *Attorney, Agent, or Firm*—Robert A. Kent; Baker Botts

(57) ABSTRACT

Methods of reducing the viscosity of a viscosified treatment fluid are provided which comprise the steps of: providing a viscosified treatment fluid that comprises water, a crosslinked gelling agent, and a delinking composition capable of delinking at least a portion of the crosslinked gelling agent wherein the delinking composition comprises a delinking agent; and allowing the crosslinked gelling agent and the delinking composition to interact so as to delink at least a portion of the crosslinked gelling agent. Also provided are methods of reusing viscosified treatment fluids, methods of fracturing subterranean formations, and methods of gravel packing subterranean formations. Also provided are delinking compositions capable of delinking at lest a portion of a crosslinked gelling agent; and a viscosified treatment fluid comprising water, a crosslinked gelling agent, and a delinking composition capable of delinking at least a portion of the crosslinked gelling agent wherein the delinking composition comprises a delinking agent.

34 Claims, No Drawings

METHODS AND COMPOSITIONS FOR REDUCING THE VISCOSITY OF TREATMENT FLUIDS

BACKGROUND OF THE INVENTION

The present invention relates to methods and compositions for treating subterranean formations, and more specifically, to improved methods and compositions for reducing the viscosity of viscosified treatment fluids.

Viscosified treatment fluids are used in a variety of operations in subterranean formations. For example, viscosified treatment fluids have been used as drilling fluids, fracturing fluids, and gravel packing fluids. Viscosified treatment fluids generally have a viscosity that is sufficiently high to suspend particulates for a desired period of time, to transfer hydraulic pressure, and/or to prevent undesired leak-off of fluids into the formation.

Most viscosified treatment fluids include gelling agent molecules that are crosslinked to increase their viscosity. The gelling agents typically used in viscosified treatment fluids are usually biopolymers or synthetic polymers. Common gelling agents include, inter alia, galactomannan gums, cellulosic polymers, and polysaccharides. The crosslinking between gelling agent molecules occurs through the action of a crosslinker. Conventional crosslinkers generally comprise boron, aluminum, antimony, zirconium, magnesium, or titanium.

In some applications e.g., in subterranean well operations, after a viscosified treatment fluid has performed its desired function, the fluid may be "broken," meaning that its viscosity is reduced. Breaking a viscosified treatment fluid may make it easier to remove the viscosified treatment fluid from the subterranean formation, a step that generally is completed before the well is returned to production. The breaking of viscosified treatment fluids is usually accomplished by incorporating "breakers" into the viscosified treatment fluids. Traditional breakers include, inter alia, enzymes, oxidizers, and acids. As an alternative to using traditional breakers, a viscosified treatment fluid may break naturally if given enough time and/or exposure to a sufficient temperature. This may be problematic, however, as it may increase the amount of time before the well may be returned to production.

In some situations, the use of traditional breakers is associated with premature and/or incomplete viscosity reduction. This may be problematic. For example, in a fracturing operation, a viscosified treatment fluid may be introduced into a subterranean formation at a pressure sufficient to create or enhance at least one fracture therein. Premature viscosity reduction can decrease the quantity and/or length of fractures generated within the formation, and therefore may decrease the likelihood that the fracturing operation will result in enhanced production. In addition, premature viscosity reduction can cause particulates like proppants to settle out of the fluid in an undesirable location and/or at an undesirable time. Traditional breakers also can be problematic in that they may chemically degrade gelling agents. As a result, pieces of the degraded gelling agent may adhere to the formation, clogging the pore throats of the formation, and thereby potentially impacting the production of desirable fluids. Moreover, the degradation of gelling agents prevents them from being reused.

SUMMARY OF THE INVENTION

The present invention relates to methods and compositions for treating subterranean formations, and more specifically, to improved methods and compositions for reducing the viscosity of viscosified treatment fluids.

In one embodiment, the present invention provides a method of reducing the viscosity of a viscosified treatment fluid comprising the steps of: providing a viscosified treatment fluid that comprises water, a crosslinked gelling agent, and a delinking composition capable of delinking at least a portion of the crosslinked gelling agent wherein the delinking composition comprises a delinking agent; and allowing the crosslinked gelling agent and the delinking composition to interact so as to delink the crosslinked gelling agent.

In one embodiment, the present invention provides a method of reusing a viscosified treatment fluid comprising the steps of: providing a first viscosified treatment fluid that comprises water, a crosslinked gelling agent, and a delinking composition capable of delinking at least a portion of the crosslinked gelling agent wherein the delinking composition comprises a delinking agent; allowing the crosslinked gelling agent and the delinking composition to interact so as to delink at least a portion of the crosslinked gelling agent to form a delinked viscosified treatment fluid comprising one or more gelling agent molecules; crosslinking the gelling agent molecules with a crosslinker to form a crosslinked gelling agent to form a second viscosified treatment fluid; and using the second viscosified treatment fluid in a chosen application.

In one embodiment, the present invention provides a method of reusing a viscosified treatment fluid comprising the steps of: providing a viscosified treatment fluid that comprises water, a crosslinked gelling agent, and a delinking composition capable of delinking at least a portion of the crosslinked gelling agent wherein the delinking composition comprises a delinking agent; allowing the crosslinked gelling agent and the delinking composition to interact so as to delink at least a portion of the crosslinked gelling agent to form a delinked viscosified treatment fluid; recovering the delinked viscosified treatment fluid; and reusing a component of the delinked viscosified treatment fluid.

In one embodiment, the present invention provides a method for fracturing a subterranean formation comprising the step of: providing a viscosified treatment fluid that comprises water, a crosslinked gelling agent, and a delinking composition capable of delinking at least a portion of the crosslinked gelling agent wherein the delinking composition comprises a delinking agent; placing the viscosified treatment fluid in the subterranean formation at a pressure sufficient to create or enhance one or more fractures therein; and allowing the crosslinked gelling agent and the delinking composition to interact so as to delink at least a portion of the crosslinked gelling agent.

In one embodiment, the present invention provides a method for placing a gravel pack in a subterranean formation comprising the steps of: providing a viscosified treatment fluid that comprises water, a crosslinked gelling agent, particulates, and a delinking composition capable of delinking at least a portion of the crosslinked gelling agent wherein the delinking composition comprises a delinking agent; placing the viscosified treatment fluid in a portion of a well bore so as to create a gravel pack; and allowing the crosslinked gelling agent and the delinking composition to interact so as to delink at least a portion of the crosslinked gelling agent.

In one embodiment, the present invention provides a delinking composition capable of delinking at least a portion of a crosslinked gelling agent wherein the delinking composition comprises a delinking agent.

In one embodiment, the present invention provides a viscosified treatment fluid comprising water, a crosslinked gelling agent, and a delinking composition capable of delinking at least a portion of the crosslinked gelling agent wherein the delinking composition comprises a gelling agent.

The features and advantages of the present invention will be readily apparent to those skilled in the art upon a reading of the description of the preferred embodiments that follows.

DESCRIPTION OF PREFERRED EMBODIMENTS

The present invention relates to methods and compositions for treating subterranean formations, and more specifically, to improved methods and compositions for reducing the viscosity of viscosified treatment fluids. The methods and compositions of the present invention are useful in a variety of applications wherein it is desirable to reduce the viscosity of a viscosified treatment fluid. Examples include, but are not limited to, subterranean applications such as fracturing and gravel packing. The delinking compositions of the present invention, in certain embodiments, may allow for recovery and reuse of viscosified treatment fluids, rather than necessitating disposal of such fluids. Such reuse includes the reuse of the viscosified treatment fluid in its entirety, or any individual component or combination of components thereof. The ability to reuse viscosified treatment fluids may offer considerable cost savings as compared to single-use conventional fluids. Reuse of viscosified treatment fluids, inter alia, may reduce the environmental impact associated with the water and chemical demand of viscosified treatment fluids used in subsequent operations, as well as the associated waste disposal costs.

The viscosified treatment fluids of the present invention generally comprise water, a crosslinked gelling agent, and a delinking composition of the present invention. A crosslinked gelling agent may be formed when one or more metals provided by one or more crosslinkers interact with at least two gelling agent molecules to form one or more crosslinks between the gelling agent molecules. The term "crosslink" or "crosslinking" refers to a comparatively short connecting unit (as in a chemical bond or chemically bonded group), in relation to a monomer, oligomer, or polymer, between neighboring chains of atoms in a complex chemical molecule, e.g., a polymer. In certain embodiments, one or more metals may maintain the crosslinks of a crosslinked gelling agent. When present, crosslinked gelling agents are capable of increasing the viscosity of viscosified treatment fluids.

The water of the viscosified treatment fluids of the present invention can comprise fresh water, salt water (e.g., water containing one or more salts dissolved therein), brine (e.g., saturated salt water), or seawater. The water can be from any source, if it does not contain an excess of compounds that adversely affect other components in the viscosified treatment fluid.

The gelling agents of the crosslinked gelling agents present in the viscosified treatment fluids of the present invention typically comprise biopolymers, synthetic polymers, or a combination thereof. A variety of gelling agents can be used in conjunction with the methods and compositions of the present invention, including, but not limited to, hydratable polymers that contain one or more functional groups such as hydroxyl, cis-hydroxyl, carboxylic acids, derivatives of carboxylic acids, sulfate, sulfonate, phosphate, phosphonate, amino, or amide. In certain exemplary embodiments, the gelling agents may be biopolymers comprising polysaccharides, and derivatives thereof, that contain one or more of these monosaccharide units: galactose, mannose, glucoside, glucose, xylose, arabinose, fructose, glucuronic acid, or pyranosyl sulfate. Examples of suitable biopolymers include, but are not limited to, guar gum and derivatives thereof, such as hydroxypropyl guar and carboxymethylhydroxypropyl guar, and cellulose derivatives, such as hydroxyethyl cellulose. Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone. In other exemplary embodiments, the gelling agent molecule may be depolymerized. The term "depolymerized," as used herein, generally refers to a decrease in the molecular weight of the gelling agent molecule. Depolymerized gelling agent molecules are described in U.S. Pat. No. 6,488,091 B1 issued Dec. 3, 2002 to Weaver, et al., the relevant disclosure of which is incorporated herein by reference. Suitable gelling agents generally are present in the viscosified treatment fluids of the present invention in an amount in the range of from about 0.1% to about 5% by weight of the water therein. In certain exemplary embodiments, the gelling agents are present in the viscosified treatment fluids of the present invention in an amount in the range of from about 0.2% to about 1% by weight of the water therein.

Crosslinkers may be used to crosslink gelling agent molecules to form crosslinked gelling agents. Crosslinkers typically comprise at least one metal that is capable of crosslinking at least two gelling agent molecules. Examples of suitable crosslinkers include, but are not limited to, zirconium compounds (such as, for example, zirconium lactate, zirconium lactate triethanolamine, zirconium carbonate, zirconium acetylacetonate, zirconium malate, zirconium citrate, and zirconium diisopropylamine lactate); titanium compounds (such as, for example, titanium lactate, titanium malate, titanium citrate, titanium ammonium lactate, titanium triethanolamine, and titanium acetylacetonate); aluminum compounds (such as, for example, aluminum lactate or aluminum citrate); antimony compounds; chromium compounds; iron compounds; copper compounds; zinc compounds; or a combination thereof. An example of a suitable commercially available zirconium-based crosslinker is "CL-24" available from Halliburton Energy Services, Inc., Duncan, Okla. An example of a suitable commercially available titanium-based crosslinker is "CL-39" available from Halliburton Energy Services, Inc., Duncan Okla. Suitable crosslinkers generally are present in the viscosified treatment fluids of the present invention in an amount sufficient to provide, inter alia, the desired degree of crosslinking between gelling agent molecules. In certain exemplary embodiments of the present invention, the crosslinkers may be present in the viscosified treatment fluids of the present invention in an amount in the range from about 0.001% to about 10% by weight of the water therein. In certain exemplary embodiments of the present invention, the crosslinkers may be present in the viscosified treatment fluids of the present invention in an amount in the range from about 0.01% to about 1% by weight of the water therein. Individuals skilled in the art, with the benefit of this disclosure, will recognize the exact type and amount of crosslinker to use depending on factors such as the specific gelling agent, desired viscosity, and formation conditions.

The viscosity of the viscosified treatment fluids of the present invention may be reduced by the delinking compositions of the present invention. The delinking compositions of the present invention generally comprise a delinking agent. The term "delinking agent" refers to compounds that are capable of delinking crosslinked gelling agents. The term "delink" or "delinking" refers to the reversible removal of one or more crosslinks of a crosslinked gelling agent without adversely affecting the crosslinked gelling agent or the gelling agent molecules. The delinking compositions of the present invention may be present in the viscosified treatment fluids of the present invention in an amount effective to delink at least one crosslink of a crosslinked gelling agent in a viscosified treatment fluid. In certain embodiments, the delinking compositions may be present in the viscosified treatment fluids in the range of from about 0.1% to about 5% by weight of the water therein. The amount of a delinking composition present in a viscosified treatment fluid may depend on such factors as the specific gelling agent, particular crosslinker, formation conditions, and relative break time desired. For instance, an operator may elect to increase the amount of a delinking composition present in a viscosified treatment fluid when elevated concentrations of metals (e.g., from seawater) are present. In some embodiments, additives may be present in the delinking compositions of the present invention. Such additives may include, but are not limited to, buffers, binders, storage stabilizing agents, biocides or biostatic agents, and the like. Individuals skilled in the art, with the benefit of this disclosure, will recognize the type and amount of suitable additives to use depending on a particular application.

The delinking agents of the delinking compositions of the present invention generally are capable of sequestering or chelating metals. Such chelation results in a delinking agent-metal chelate. Suitable delinking agents typically include organic compounds capable of chelating metals, like titanium, zirconium, aluminum, antimony, chromium, iron, copper, zinc ions, or a combination thereof. Delinking agents that are suitable for use in the delinking compositions of the present invention generally comprise at least two ionizable acid groups. These acid groups may comprise carboxyl groups, phosphonyl groups, sulphonyl groups, phosphinyl groups, or a combination thereof. Suitable delinking agents may be salts (such as, for example, alkali metal or ammonium salts), or mixtures of acids and salts. In certain exemplary embodiments of the present invention, the delinking agents may comprise dicarboxylic amino acids, dicarboxylic amino acid salts, or combinations thereof. In other exemplary embodiments of the present invention, the delinking agents may comprise aspartic acid or a derivative thereof. Suitable derivatives of aspartic acid include, but are not limited to, aspartate, polyaspartic acid, polyaspartate, succinimide, polysuccinimide, or a combination thereof. The delinking agents may be present in the delinking compositions of the present invention in an amount up to and at about 100% by weight of the delinking composition.

The delinking compositions of the present invention may have any suitable form. For instance, the delinking composition may be a liquid, a gel, an emulsion, or a solid. In certain applications, a liquid form may be useful, e.g., when a faster break is desired. In certain embodiments, the delinking compositions of the present invention may be used in a form that allows for a delayed release of the delinking composition into a viscosified treatment fluid. A delayed release of the delinking composition may be desirable, for instance, when the subterranean operation will involve a long pump time. To provide a delayed release of the delinking composition, in certain exemplary embodiments, the delinking composition may be encapsulated or enclosed within an outer coating that is capable of degrading at a desired time. A person having ordinary skill in the art, with the benefit of this disclosure, will recognize the appropriate encapsulation technique to use with the delinking compositions of the present invention.

In certain embodiments of the delinking compositions of the present invention, the delinking compositions may comprise a degradable polymer as a coating or containment means, so as to delay the release of the delinking compositions. Suitable examples of degradable polymers that may be used as a coating or containment means in conjunction with the delinking compositions of the present invention include, but are not limited to, polysaccharides such as dextran or cellulose; chitins; chitosans; proteins; aliphatic polyesters; poly(lactides); poly(glycolides); poly($\epsilon$-caprolactones); poly(hydroxybutyrates); poly(anhydrides); aliphatic polycarbonates; ortho esters; poly(orthoesters); poly (amino acids); poly(ethylene oxides); and poly (phosphazenes). Other suitable materials include heat-sealable materials, other thermoplastic materials, or materials that may be dissolved with an appropriate solvent (e.g., hydroxy propyl methylcellulose, pectin, polyethylene oxide, polyvinyl alcohol, alginate, polycaprolactone, gelatinised starch-based materials, and the like). In certain exemplary embodiments, blends of these materials also may be suitable. Other materials that undergo an irreversible degradation also may be suitable, if the products of the degradation do not adversely affect other components.

In certain exemplary embodiments of the present invention, delayed delinking may be achieved by using delinking compositions of the present invention that comprise hydrolyzable delinking agents. Such delinking compositions may become capable of delinking the viscosified treatment fluids of the present invention over time as the delinking agent is hydrolyzed. Examples of hydrolyzable delinking agents include, but are not limited to, succinimide and polysuccinimide. Under the appropriate conditions of pH, hydrolysis of hydrolyzable delinking agents may result in the formation of carboxylate anions (such as, for example, polyaspartic acids, polyaspartates, aspartic acids, and aspartates), which are then capable of delinking the crosslinks of crosslinked gelling agents. One of ordinary skill in the art, with the benefit of this disclosure, will recognize the appropriate time, temperature, and pH necessary to hydrolyze the hydrolyzable delinking agents of the delinking compositions of the present invention.

The viscosified treatment fluids of the present invention optionally may comprise pH adjusting agents. Examples of suitable pH adjusting agents include, but are not limited to, polylactic acid, sodium hydroxide, potassium hydroxide, lithium hydroxide, hydrochloric acid, hydrofluoric acid, acetic acid, formic acid, hydroxyfluoboric acid, or a mixture thereof. Where included, suitable pH adjusting agents generally are present in the viscosified treatment fluids of the present invention in an amount sufficient to maintain the pH at a desired level. In an exemplary embodiment, a pH adjusting agent is present in a viscosified treatment fluid of the present invention in an amount in the range of from about 0.01% to about 1% by weight of the water therein. One of ordinary skill in the art, with the benefit of this disclosure, will recognize an appropriate pH adjusting agent for a chosen application.

In addition, the viscosified treatment fluids of the present invention optionally may comprise a buffer. Examples of suitable buffers include, but are not limited to, sodium acetate, acetic acid, ammonium acetate, sodium carbonate, potassium carbonate, sodium bicarbonate, potassium bicarbonate, sodium diacetate, potassium diacetate, sodium phosphate, potassium phosphate, sodium hydrogen phosphate, potassium hydrogen phosphate, sodium dihydrogen phosphate, potassium dihydrogen phosphate, and the like. Where included, the buffer generally is present in the viscosified treatment fluids of the present invention in an amount sufficient to maintain the pH of such treatment fluid at a desired level. In an exemplary embodiment, a buffer is present in a viscosified treatment fluid of the present invention in an amount in the range of from about 0.01% to about 1% by weight of the water therein. One of ordinary skill in the art, with the benefit of this disclosure, will recognize an appropriate buffer for a chosen application.

The viscosified treatment fluid of the present invention optionally may comprise particulates suitable for subterranean applications. Suitable particulates include, for example, gravel, natural sand, quartz sand, particulate garnet, glass, ground walnut hulls, nylon pellets, aluminum pellets, bauxite, ceramics, polymeric materials, a combination thereof, or the like. Suitable sizes range from about 4 to about 100 U.S. mesh. In certain exemplary embodiments, the particulates have a particle size in the range of from about 10 to about 70 U.S. mesh.

Additional additives may be present in the viscosified treatment fluids of the present invention as deemed appropriate by one skilled in the art with the benefit of this disclosure. Examples of such additives include, but are not limited to, surfactants, scale inhibitors, clay stabilizers, silicate-control agents, gases, antifoaming agents, foaming agents, storage stabilizers, biocides, biostatic agents, or a combination thereof. In certain exemplary embodiments of the present invention, a chelator may be present in the treatment fluid to sequester any undesirable cations that may be present in the water, for example, when seawater is used as the water. Suitable chelators are those that are incapable of delinking a crosslinked gelling agent. Examples of suitable chelators include, but are not limited to, hydroquinone, orcinol, resorcinol, trihydroxybenzene, salicylate, m-hydroxybenzoate, p-hydroxybenzoate, nitrilotriacetic acid, and diethylenetriaminepentaacetate.

The viscosified treatment fluids of the present invention can be utilized for carrying out a variety of subterranean well treatments, including, but not limited to, fracturing and gravel packing subterranean formations. In certain exemplary embodiments wherein the viscosified treatment fluids of the present invention are used in conjunction with fracturing operations, fracturing fluids comprising water, delinking compositions of the present invention, and a crosslinked gelling agent may be placed in a subterranean formation at a sufficient pressure to create or enhance one or more fractures therein. After the fracturing fluid has performed its desired function, or after a desired period of time, the delinking composition delinks at least one crosslinked gelling agent. In certain embodiments, this delinking will reduce the viscosity of the fracturing fluid to a desired degree.

In certain exemplary embodiments wherein the viscosified treatment fluids of the present invention are used in conjunction with gravel packing operations, gravel packing fluids comprising water, particulates, delinking compositions of the present invention, and crosslinked gelling agents are placed in a portion of a well bore so as to create a gravel pack. After the gravel pack is substantially in place, the delinking composition delinks at least one crosslinked gelling agent. In certain exemplary embodiments, this delinking will reduce the viscosity of the gravel packing fluid to a desired degree.

The present invention also provides methods of reusing viscosified treatment fluids or any individual component or combination of components therein. Viscosified treatment fluids of the present invention may be reused because the delinking compositions of the present invention provide a means for reversibly delinking crosslinked gelling agents without damaging the individual gelling agent molecules. Generally, reusing the viscosified treatment fluids of the present invention involves delinking a crosslinked gelling agent with a delinking composition, and either crosslinking the resultant gelling agent molecules with a crosslinker or reusing one or more components of the viscosified treatment fluid, e.g., the water therein. The crosslinker that may be present in the delinked viscosified treatment fluid is added in an amount sufficient to overcome the delinking of any delinking composition that may be present in the delinked viscosified treatment fluid. The term "delinked viscosified treatment fluid" refers to a viscosified treatment fluid where at least one crosslinked gelling agent has been delinked, resulting in two gelling agent molecules. In other exemplary embodiments, a viscosified treatment fluid of the present invention is first contacted with a delinking composition of the present invention to delink one or more crosslinked gelling agents in the viscosified treatment fluid. After delinking and recovery from the subterranean formation, the pH of the delinked viscosified treatment fluid may be adjusted to a level sufficient to precipitate the delinking agent-metal chelate that forms during delinking. Once precipitated, the delinking agent-metal chelate may be separated from the delinked viscosified treatment fluid, e.g., by filtration to avoid clogging formation pores with the precipitated delinking agent-metal chelate. One or more components of the delinked viscosified treatment fluid then may be reused or the delinked viscosified treatment fluid may be viscosified by crosslinking any gelling agent molecules present with a crosslinker to form crosslinked gelling agents.

An example of a method of the present invention is a method of reusing a viscosified treatment fluid comprising the steps of: providing a first viscosified treatment fluid that comprises water, a crosslinked gelling agent, and a delinking composition capable of delinking at least a portion of the crosslinked gelling agent wherein the delinking composition comprises a delinking agent; allowing the crosslinked gelling agent and the delinking composition to interact so as to delink at least a portion of the crosslinked gelling agent to form a delinked viscosified treatment fluid comprising one or more gelling agent molecules; crosslinking the gelling agent molecules with a crosslinker to form a crosslinked gelling agent to form a second viscosified treatment fluid; and using the second viscosified treatment fluid in a chosen application.

Another example of a method of the present invention is a method of reusing a viscosified treatment fluid comprising the steps of: providing a viscosified treatment fluid that comprises water, a crosslinked gelling agent, and a delinking composition capable of delinking at least a portion of the crosslinked gelling agent wherein the delinking composition comprises a delinking agent; allowing the crosslinked gelling agent and the delinking composition to interact so as to delink at least a portion of the crosslinked gelling agent to form a delinked viscosified treatment fluid; recovering the delinked viscosified treatment fluid; and reusing at least one component of the delinked viscosified treatment fluid.

Another example of a method of the present invention is a method of reducing the viscosity of a viscosified treatment fluid comprising the steps of: providing a viscosified treatment fluid that comprises water, a crosslinked gelling agent, and a delinking composition capable of delinking at least a portion of the crosslinked gelling agent wherein the delinking composition comprises a delinking agent; and allowing the crosslinked gelling agent and the delinking composition to interact so as to delink at least a portion of the crosslinked gelling agent.

Another example of a method of the present invention is a method for fracturing a subterranean formation comprising the step of: providing a viscosified treatment fluid that comprises water, a crosslinked gelling agent, and a delinking composition capable of delinking at least a portion of crosslinked gelling agent wherein the delinking composition comprises a delinking agent; placing the viscosified treatment fluid in the subterranean formation at a pressure sufficient to create or enhance one or more fractures therein; and allowing the crosslinked gelling agent and the delinking composition to interact so as to delink at least a portion of the crosslinked gelling agent.

Another example of a method of the present invention provides a method for placing a gravel pack in a subterranean formation comprising the steps of: providing a viscosified treatment fluid that comprises water, a crosslinked gelling agent, particulates, and a delinking composition capable of delinking at least a portion of the crosslinked gelling agent wherein the delinking composition comprises a delinking agent; placing the viscosified treatment fluid in a portion of a well bore so as to create a gravel pack; and allowing the crosslinked gelling agent and the delinking composition to interact so as to delink at least a portion of the crosslinked gelling agent.

An example of a composition of the present invention is a delinking composition capable of delinking at least a portion of a crosslinked gelling agent wherein the delinking composition comprises a delinking agent.

Another example of a composition of the present invention is a viscosified treatment fluid comprising water, a crosslinked gelling agent, and a delinking composition capable of delinking at least a portion of the crosslinked gelling agent wherein the delinking composition comprises a delinking agent.

To facilitate a better understanding of the present invention, the following examples of preferred embodiments are given. In no way should the following examples be read to limit or define the scope of the invention.

EXAMPLES

Viscosified treatment fluid samples were prepared and the viscosities of the samples were measured over time with increasing temperatures using a Nordman Instruments Model 5004 viscometer equipped with a B2X bob. The samples included crosslinked gelling agents crosslinked with either zirconium or titanium. Comparative test samples of the viscosified treatment fluids included a delinking composition comprising various amounts of polysuccinimide as a delinking agent. Comparative test samples were tested and measured as described above.

Example 1

Delinking of Zirconium Crosslinks

A sample of a zirconium crosslinked gelling agent viscosified treatment fluid was prepared by adding to tap water: 4 wt % carboxymethylhydroxypropyl guar; 2.25 gallons per one thousand gallons ammonium acetate with 1 gallon per one thousand gallons potassium carbonate as buffer; 1 gallon of a nonionic surfactant; 2 wt % sodium thiosulfate; 0.7 gallons per one thousand gallons of a 1:1 solution of zirconium crosslinking agent in 2 wt % potassium chloride. Comparative test samples also were prepared as above with the addition of 0, 1, 1.5, or 2 grams per liter of BAYPURE® DSP disuccinimide, commercially available from Bayer Chemicals Corporation, Pittsburgh, Pa.

The temperature of the samples was increased to 325° F. and viscosities were measured. Table 1 lists the results for the sample zirconium crosslinked gelling agent viscosified treatment fluid and comparative test samples.

TABLE 1

| | | Disuccinimide | | | | |
| --- | --- | --- | --- | --- | --- | --- |
| Time (min) | Control (cP) | 0.8 wt % (cP) | 1 wt % (cP) | 1.2 wt % (cP) | 1.6 wt % (cP) | Temp. (° F.) |
| 1 | 64 | 60 | 56 | 57 | 64 | 99 |
| 10 | 1976 | 1752 | 1196 | 1198 | 489 | 296 |
| 20 | 1513 | 1422 | 1015 | 946 | 292 | 322 |
| 30 | 1346 | 1294 | 1022 | 719 | 146 | 325 |
| 40 | 1198 | 1105 | 893 | 534 | 71 | 326 |
| 50 | 1069 | 983 | 752 | 386 | 39 | 326 |
| 60 | 992 | 874 | 629 | 274 | 27 | 327 |
| 70 | 915 | 786 | 500 | 199 | 24 | 326 |
| 80 | 835 | 701 | 402 | 129 | 24 | 327 |
| 90 | 779 | 629 | 316 | 80 | 23 | 327 |
| 100 | 729 | 543 | 251 | 49 | 23 | 326 |
| 110 | 678 | 478 | 197 | 31 | 23 | 326 |
| 120 | 614 | 409 | 149 | 24 | 23 | 327 |
| 122 | 623 | 407 | 138 | 22 | 21 | 327 |

The above examples demonstrate, inter alia, that the delinking compositions of the present invention delink zirconium crosslinked gelling agents and desirably reduced the viscosity of viscosified treatment fluids.

Example 2

Delinking of Titanium Crosslinks

A sample of a titanium crosslinked gelling agent viscosified treatment fluid was prepared by adding to tap water: 4 wt % hydroxypropyl guar; 0.2 gallons per one thousand gallons ammonium acetate; 0.4 wt % alkyl sulfonate; 1 wt % sodium thiosulfate; and 1 gallon per one thousand gallons of a titanium crosslinking agent. Comparative test samples also were prepared as above with the addition of 0, 0.4, and 0.8 grams per liter of BAYPURE® DSP disuccinimide, commercially available from Bayer Chemicals Corporation, Pittsburgh, Pa.

The temperature of the samples was increased to 275° F. and viscosities were measured. Table 2 lists the results for the sample titanium crosslinked gelling agent viscosified treatment fluid and comparative test samples.

TABLE 2

| Time (min) | Control (cP) | Disuccinimide 0.4 wt % (cP) | Disuccinimide 0.8 wt % (cP) | Temperature (° F.) |
|---|---|---|---|---|
| 1 | 60 | 88 | 1125 | 92 |
| 10 | 767 | 650 | 190 | 247 |
| 20 | 673 | 504 | 141 | 269 |
| 30 | 627 | 438 | 137 | 273 |
| 40 | 595 | 372 | 131 | 274 |
| 50 | 565 | 315 | 135 | 274 |
| 60 | 521 | 238 | 129 | 274 |
| 70 | 502 | 199 | N/D | 275 |
| 80 | 467 | 172 | N/D | 275 |
| 90 | 440 | 136 | N/D | 275 |
| 100 | 413 | 121 | N/D | 276 |
| 110 | 383 | 104 | N/D | 277 |
| 120 | 356 | 93 | N/D | 276 |
| 122 | 351 | N/D | N/D | N/D |

N/D: Not determined.

The above examples demonstrate, inter alia, that the delinking compositions of the present invention delink titanium crosslinked gelling agents and desirably reduce the viscosity of viscosified treatment fluids.

Therefore, the present invention is well adapted to attain the ends and advantages mentioned as well as those that are inherent therein. While numerous changes may be made by those skilled in the art, such changes are encompassed within the spirit of this invention as defined by the appended claims.

What is claimed is:

1. A method of reducing the viscosity of a viscosified treatment fluid comprising the steps of:
   providing a viscosified treatment fluid that comprises water,
      a crosslinked gelling agent that is formed by allowing at least two gelling agent molecules and one or more crosslinkers to interact to form at least one crosslink between the gelling agent molecules, and
      a delinking composition capable of delinking at least a portion of the crosslinked gelling agent, wherein the delinking composition comprises a delinking agent that is capable of sequestering or chelating the crosslinker in the crosslinked gelling agent; and
   allowing the crosslinked gelling agent and the delinking composition to interact so as to delink at least a portion of the crosslinked gelling agent.

2. The method of claim 1 wherein the viscosified treatment fluid is a fracturing fluid or a gravel packing fluid.

3. The method of claim 1 wherein the crosslink comprises a metal.

4. The method of claim 3 wherein the metal is selected from the group consisting of titanium, zirconium, aluminum, antimony, chromium, iron, copper, zinc, and combinations thereof.

5. The method of claim 1 wherein the gelling agent is selected from the group consisting of biopolymers, synthetic polymers, and combinations thereof.

6. The method of claim 1 wherein the crosslinker is selected from the group consisting of zirconium compounds, titanium compounds, aluminum compounds, antimony compounds, chromium compounds, iron compounds, copper compounds, zinc compounds, and combinations thereof.

7. The method of claim 1 wherein the delinking composition is present in the viscosified treatment fluid in the range from about 0.1% to about 5% by weight of the water component that is present in the viscosified treatment fluid.

8. The method of claim 1 wherein the delinking agent is selected from the group consisting of aspartic acid, aspartate, and combinations thereof.

9. The method of claim 1 wherein the delinking agent is selected from the group consisting of polyaspartic acid, polyaspartate, and combinations thereof.

10. The method of claim 1 wherein the delinking agent is selected from the group consisting of succinimide, polysuccinimide, and combinations thereof.

11. The method of claim 1 wherein the delinking agent is present in the delinking composition up to and at about 100% by weight of the delinking composition.

12. The method of claim 1 wherein the delinking composition is a liquid, a gel, an emulsion, or a solid.

13. The method of claim 1 wherein at least a portion of the delinking composition is encapsulated.

14. The method of claim 1 wherein the delinking composition comprises a degradable material.

15. The method of claim 14 wherein the degradable material is selected from the group consisting of dextran, cellulose, chitins, chitosans, liquid esters, proteins, aliphatic polyesters, poly(lactides), poly(glycolides), poly($\epsilon$-caprolactones), poly(hydroxybutyrates), poly(anhydrides), aliphatic poly(carbonates), orthoesters, poly(orthoesters), poly(amino acids), poly(ethylene oxides), poly(phosphazenes), and combinations thereof.

16. A method of reusing a viscosified treatment fluid comprising the steps of:
   providing a first viscosified treatment fluid that comprises water,
      a crosslinked gelling agent that is formed by allowing at least two gelling agent molecules and one or more crosslinkers to interact to form at least one crosslink between the gelling agent molecules, and
      a delinking composition capable of delinking at least a portion of the crosslinked gelling agent, wherein the delinking composition comprises a delinking agent that is capable of sequestering or chelating the crosslinker in the crosslinked gelling agent;
   allowing the crosslinked gelling agent and the delinking composition to interact so as to delink at least a portion of the crosslinked gelling agent to form a delinked viscosified treatment fluid comprising one or more gelling agent molecules;
   crosslinking the gelling agent molecules with a crosslinker to form a crosslinked gelling agent to form a second viscosified treatment fluid; and
   using the second viscosified treatment fluid in a chosen application.

17. The method of claim 16 further comprising the steps of:
   recovering the delinked viscosified treatment fluid from a subterranean formation after allowing the crosslinked gelling agent and the delinking composition to interact so as to delink at least a portion of the crosslinked gelling agent to form a delinked viscosified treatment fluid comprising one or more gelling agent molecules;
   adjusting the pH of the viscosified treatment fluid to a level sufficient to precipitate a delinking agent-metal chelate; and
   removing the delinking agent-metal chelate from the delinked viscosified treatment fluid.

18. The method of claim 17 wherein the delinking agent-metal chelate is removed by filtration.

19. The method of claim 16 wherein the delinking agent is selected from the group consisting of aspartic acid, aspartate, and combinations thereof.

20. The method of claim 16 wherein the delinking agent is selected from the group consisting of polyaspartic acid, polyaspartate, and combinations thereof.

21. The method of claim 16 wherein the delinking agent is selected from the group consisting of succinimide, polysuccinimide, and combinations thereof.

22. A method of reusing a viscosified treatment fluid comprising the steps of:
   providing a viscosified treatment fluid that comprises
       water,
       a crosslinked gelling agent that is formed by allowing at least two gelling agent molecules and one or more crosslinkers to interact to form at least one crosslink between the gelling agent molecules, and
       a delinking composition capable of delinking at least a portion of the crosslinked gelling agents wherein the delinking composition comprises a delinking agent that is capable of sequestering or chelating the crosslinker in the crosslinked gelling agent;
   allowing the crosslinked gelling agent and the delinking composition to interact so as to delink at least a portion of the crosslinked gelling agent to form a delinked viscosified treatment fluid;
   recovering the delinked viscosified treatment fluid; and
   reusing at least one component of the delinked viscosified treatment fluid.

23. The method of claim 22 wherein the delinking agent is selected from the group consisting of aspartic acid, aspartate, and combinations thereof.

24. The method of claim 22 wherein the delinking agent is selected from the group consisting of polyaspartic acid, polyaspartate, and combinations thereof.

25. The method of claim 22 wherein the delinking agent is selected from the group consisting of succinimide, polysuccinimide, and combinations thereof.

26. A method for fracturing a subterranean formation comprising the steps of:
   providing a viscosified treatment fluid that comprises
       water,
       a crosslinked gelling agent that is formed by allowing at least two gelling agent molecules and one or more crosslinkers to interact to form at least one crosslink between the gelling agent molecules, and
       a delinking composition capable of delinking at least a portion of the crosslinked gelling agent, wherein the delinking composition comprises a delinking agent that is capable of sequestering or chelating the crosslinker in the crosslinked gelling agent;
   placing the viscosified treatment fluid in the subterranean formation at a pressure sufficient to create or enhance one or more fractures therein; and
   allowing the crosslinked gelling agent and the delinking composition to interact so as to delink at least a portion of the crosslinked gelling agent.

27. The method of claim 26 wherein the viscosified treatment fluid further comprises particulates.

28. The method of claim 26 wherein the delinking agent is selected from the group consisting of aspartic acid, aspartate, and combinations thereof.

29. The method of claim 26 wherein the delinking agent is selected from the group consisting of polyaspartic acid, polyaspartate, and combinations thereof.

30. The method of claim 26 wherein the delinking agent is selected from the group consisting of succinimide, polysuccinimide, and combinations thereof.

31. A method for placing a gravel pack in a subterranean formation comprising the steps of:
   providing a viscosified treatment fluid that comprises
       water,
       a crosslinked gelling agent that is formed by allowing at least two gelling agent molecules and one or more crosslinkers to interact to form at least one crosslink between the gelling agent molecules,
       particulates, and
       a delinking composition capable of delinking at least a portion of the crosslinked gelling agent, wherein the delinking composition comprises a delinking agent that is capable of sequestering or chelating the crosslinker in the crosslinked gelling agent;
   placing the viscosified treatment fluid in a portion of a well bore so as to create a gravel pack; and
   allowing the crosslinked gelling agent and the delinking composition to interact so as to delink at least a portion of the crosslinked gelling agent.

32. The method of claim 31 wherein the delinking agent is selected from the group consisting of aspartic acid, aspartate, and combinations thereof.

33. The method of claim 31 wherein the delinking agent is selected from the group consisting of polyaspartic acid, polyaspartate, and combinations thereof.

34. The method of claim 31 wherein the delinking agent is selected from the group consisting of succinimide, polysuccinimide, and combinations thereof.

* * * * *